Patented May 17, 1949

2,470,627

UNITED STATES PATENT OFFICE 2,470,627

PHOSPHOR

Humboldt W. Leverenz, Princeton, N. J., assignor to Radio Corporation of America, a corporation of Delaware No Drawing. Application October 24, 1945, Serial No. 624,322

1 Claim. (Cl. 252—301.6)

This invention relates to phosphors for use in cathode ray beam tubes.

In the application of Maggio Banca, filed April 19, 1945, Serial No. 589,269, a phosphor is disclosed comprising manganese-activated zinc fluoride and magnesium fluoride combined therewith, which has novel decay characteristics.

It is an object of this invention to provide another constituent for a fluoride phosphor for readily varying the decay time.

Other objects will appear in the following description:

In certain uses, such as cathode beam tubes for radar uses, phosphors are required which have greater persistence than that obtainable by zinc silicates and similar phosphors used in television tubes. In certain of such uses the persistence of luminescence after cessation of the excitation is usually from .25 to 1 second, as the sweep frequencies are relatively low. These phosphors, however, must not have an undue carry-over from one scansion to another. For this particular purpose, manganese-activated zinc fluoride is exceptionally well fitted. Its characteristic decay curve is less steep immediately after cessation of the excitation than zinc silicate, for example, and compares favorably therewith in initial intensity of luminescence.

In view of the fact that the sweep times of radars and similar systems vary depending upon particular installations, it is highly advantageous to be able to provide a phosphor of a particular decay characteristic for the cathode beam tube. I have found cadmium fluoride is an admirable constituent of fluoride phosphors to increase the decay time, either for zinc fluoride or zinc and magnesium fluoride together. Cadmium fluoride, like zinc and magnesium fluorides, fluoresces under cathode ray beam excitation but not to such a marked extent. It, therefore, cannot entirely supplant the zinc or magnesium fluoride without unduly lowering the luminescence. However, it has the property of increasing the decay time of zinc and magnesium fluoride when crystallized with them. The decay time can be varied as much as desired by increasing the proportion of cadmium fluoride but by adding increasing amounts, a point is reached where the fluorescence is too low for practical use. The cadmium fluoride may be added to zinc fluoride or to zinc-magnesium fluoride and crystallized therewith after adding from .001 to .1 mole of manganese per mole of zinc fluoride or zinc-magnesium fluoride. The materials may also be mixed together as the oxides of zinc and cadmium, or the oxides of zinc, cadmium and magnesium and then converted to fluorides by adding hydrofluoric acid, preferably in about 10% excess for complete conversion of the oxides to fluorides. The manganese may then be added as manganese nitrate solution in sufficient amount to give the chosen molar ratio, which preferably is about 0.004 to 0.02 molal of the zinc fluoride or zinc and magnesium fluorides. The mixture should be well stirred and evaporated to dryness, preferably in a water bath. The dried mixture is then crystallized in any suitable furnace, for example at about 800° C., but this may vary from 600° C. to 870° C. although it is desirable not to exceed the melting temperature of zinc fluoride (872° C.). After cooling, the mass may be ground to the desired fineness and applied in any of the known ways for making phosphor screens, which is not part of this invention.

The cadmium fluoride may be substituted for the zinc fluoride, or for the magnesium fluoride in the zinc-magnesium fluoride mixture, up to 90% of the other fluoride and thus provide a procedure for facile variation of the decay times of the fluoride phosphor.

Having described my invention, what I claim is:

A phosphor material for a cathode ray beam tube consisting of zinc fluoride crystallized with cadmium and 0.001 to 0.1 mole of manganese activator per mole of zinc fluoride, said cadmium fluoride being not more than 90% of the zinc fluoride.

HUMBOLDT W. LEVERENZ.

REFERENCES CITED

The following references are of record in the file of this patent:

UNITED STATES PATENTS

| Number | Name | Date |
| --- | --- | --- |
| 2,049,765 | Fischer | Aug. 4, 1936 |
| 2,372,071 | Fernberger | Mar. 20, 1945 |

OTHER REFERENCES

Mellor, "Comprehensive Treatise on Inorganic and Theoretical Chemistry," vol. IV, page 296.

Chemical Abstracts 18, page 2287.